(12) United States Patent
Pangam et al.

(10) Patent No.: US 10,798,072 B2
(45) Date of Patent: Oct. 6, 2020

(54) PASSWORD MANAGEMENT SYSTEM AND PROCESS

(71) Applicant: MASTERCARD INTERNATIONAL INCORPORATED, Purchase, NY (US)

(72) Inventors: Siddhesh Pangam, Maharashtra (IN); Karabi Ghanta, Mumbai (IN); Tushar Uddhav Gaikar, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 291 days.

(21) Appl. No.: 15/829,270

(22) Filed: Dec. 1, 2017

(65) Prior Publication Data
US 2018/0176195 A1 Jun. 21, 2018
US 2019/0028447 A9 Jan. 24, 2019

(30) Foreign Application Priority Data

Dec. 16, 2016 (SG) .......................... 10201610585W

(51) Int. Cl.
| | |
|---|---|
| H04L 29/06 | (2006.01) |
| G06F 21/60 | (2013.01) |
| G06F 16/951 | (2019.01) |
| G06F 21/45 | (2013.01) |
| G06F 21/31 | (2013.01) |
| G06F 16/9535 | (2019.01) |

(52) U.S. Cl.
CPC ............ *H04L 63/06* (2013.01); *G06F 16/951* (2019.01); *G06F 16/9535* (2019.01); *G06F 21/31* (2013.01); *G06F 21/45* (2013.01); *G06F 21/602* (2013.01); *H04L 63/083* (2013.01); *H04L 63/20* (2013.01)

(58) Field of Classification Search
CPC ....... H04L 63/06; H04L 63/083; H04L 63/20; G06F 16/9535; G06F 16/951; G06F 21/31; G06F 21/45; G06F 21/602
See application file for complete search history.

(56) References Cited

U.S. PATENT DOCUMENTS

| | | | |
|---|---|---|---|
| 7,636,852 B1 | 12/2009 | Balasubramanian et al. | |
| 8,838,959 B2 * | 9/2014 | Lewis | G06F 21/45 713/155 |
| 9,558,341 B1 * | 1/2017 | Allababidi | G06F 21/41 |
| 9,648,012 B1 | 5/2017 | Machani et al. | |
| 2005/0027713 A1 * | 2/2005 | Cameron | G06F 21/41 |
| 2007/0016804 A1 | 1/2007 | Kemshall | |
| 2013/0254856 A1 | 9/2013 | Krishan | |
| 2015/0286816 A1 * | 10/2015 | Adler | G06F 21/45 726/6 |
| 2016/0171208 A1 * | 6/2016 | Matthiesen | H04L 63/102 726/6 |
| 2016/0373436 A1 * | 12/2016 | Kapoor | H04L 63/0846 |
| 2017/0214712 A1 * | 7/2017 | Maxwell | H04L 63/1441 |

* cited by examiner

*Primary Examiner* — Kristine L Kincaid
*Assistant Examiner* — Alexander R Lapian
(74) *Attorney, Agent, or Firm* — Armstrong Teasdale LLP

(57) ABSTRACT

The present disclosure provides a password management process and system. The updating of the password data in the process and system is performed based, at least in part, on the functional account data and corresponding scheduling data, said scheduling data representing criteria for updating the password of, at least, the particular functional account.

17 Claims, 8 Drawing Sheets

PASSWORD MANAGEMENT SYSTEM AND PROCESS

CROSS REFERENCE TO RELATED APPLICATIONS

This patent application claims priority to Singapore Application No. 10201610585W filed on Dec. 16, 2016, the disclosure of which is incorporated by reference herein in its entirety as part of the present application.

BACKGROUND

The present disclosure relates to a system and process of password management for the automatic updating of functional accounts associated with an application.

Computing systems have become integrated into many aspects of modern life. In recent decades the amount of information stored within, and managed by, computing systems has dramatically increased. Financial transactions, health and medical records, educational resources and government registrations are all now represented by electronic data that is managed by computing devices, and/or networks of computing devices.

To organize and manage the large amounts of electronically stored information, entities (such as financial institutions, governments, etc.) typically provide one or more electronic applications, in the form of software or firmware packages, which are typically executed on a computing device to grant users (such as customers, or persons registered with the entity) access to particular information via one or more respective electronic services. For example, MasterCard may provide a MasterCard Online Card Management application which a user can install and operate on their smartphone or tablet device in order to access information related to their MasterCard credit or debit card via digital wallet and/or transaction viewer services.

These electronic applications typically utilize password based authentication mechanisms to ensure that the entity's services are accessible only to users with appropriate authorization. This extends to enterprise level users, who may need to access different services of the entity application based on their specific role (i.e. in relation to the development or support of the application). In password-based authentication, the entity and the user share, in advance, knowledge of a password (typically consisting of a string in the form of alpha, numeric and/or special characters). The combination of the user's password and a corresponding user identifier (such as a user name) is required to operate the application by authenticating the user. While the user identifier may be publicly known, the password must be kept secret in order to prevent unauthorized parties from accessing the electronic application and/or its services.

As a result, entities often employ methods to manage the passwords of users, including requiring that passwords be updated (i.e. changed) periodically to reduce the likelihood of unauthorized access to information provided by the electronic application, as may occur if a password of that user becomes exposed to a third party. Password management can therefore become complex for an entity with a large number of enterprise users (such as, for example, developers and support staff of the entity), and where there are multiple passwords that must be stored and updated by the entity in order to enable these users to securely access particular services. Conventional enterprise password management solutions involve the entity storing a representation of each password, and prompting a special user (such as an administrator) to update each password when particular password update conditions are satisfied.

Despite the convenience of these password management technologies, there remains room for improvement. It is desired to provide a system and process for password management that alleviates one or more difficulties of the prior art, or to at least provide a useful alternative.

BRIEF DESCRIPTION

A first aspect of the present disclosure provides a process for managing passwords of an entity application, including receiving, at a password management device, functional account data representing one or more functional accounts associated with the entity application for use by a user, and the corresponding password data of each functional account, storing, into a repository, the functional account data, and updating the password data of a particular functional account of the one or more functional accounts associated with the entity application by performing, at the password management device, the steps of: i) retrieving, from the repository, the stored functional account data of said particular functional account, ii) processing the retrieved functional account data to generate new password data representing a new password of the particular functional account, iii) storing, into the repository, the new password data, and iv) transmitting the new password data to a corresponding service device of the entity application to synchronize the service device with the password management device. The updating of the password data may be performed based, at least in part, on the functional account data and corresponding scheduling data, said scheduling data representing criteria for updating the password of, at least, the particular functional account.

Another aspect of the present disclosure provides a password management system, including a password management device, including a processor, and a computer readable memory, and a repository, the password management device configured to execute a password management process, the process including the steps of: receiving, functional account data representing one or more functional accounts associated with the entity application for use by a user, and the corresponding password data of each functional account, storing, into the repository, the functional account data, and updating the password data of a particular functional account of the one or more functional accounts associated with the entity application by performing the steps of: i) retrieving, from the repository, the stored functional account data of said particular functional account, ii) processing the retrieved functional account data to generate new password data representing a new password of the particular functional account, iii) storing, into the repository, the new password data, and iv) transmitting the new password data to a corresponding service device of the entity application to synchronize the service device with the password management device. The updating of the password data may be performed based, at least in part, on the functional account data and corresponding scheduling data, said scheduling data representing criteria for updating the password of, at least, the particular functional account.

BRIEF DESCRIPTION OF THE DRAWINGS

Some embodiments of the present disclosure are hereinafter described, by way of example only, with reference to the accompanying drawings, wherein.

DETAILED DESCRIPTION

Overview

Some specific shortcomings with existing password management systems and processes employed by entities to provide users with secure access to particular electronic information have been identified. Traditionally, password based authentication for electronic services has involved the management and use of a single password and corresponding user identifier used by a user to operate an application on their computing device. Management of the password typically involves the storage of a secure representation of the password (such as a ciphertext produced by an encryption method) within a server computing device of the entity that provides the application and the corresponding services.

Figure 1A:
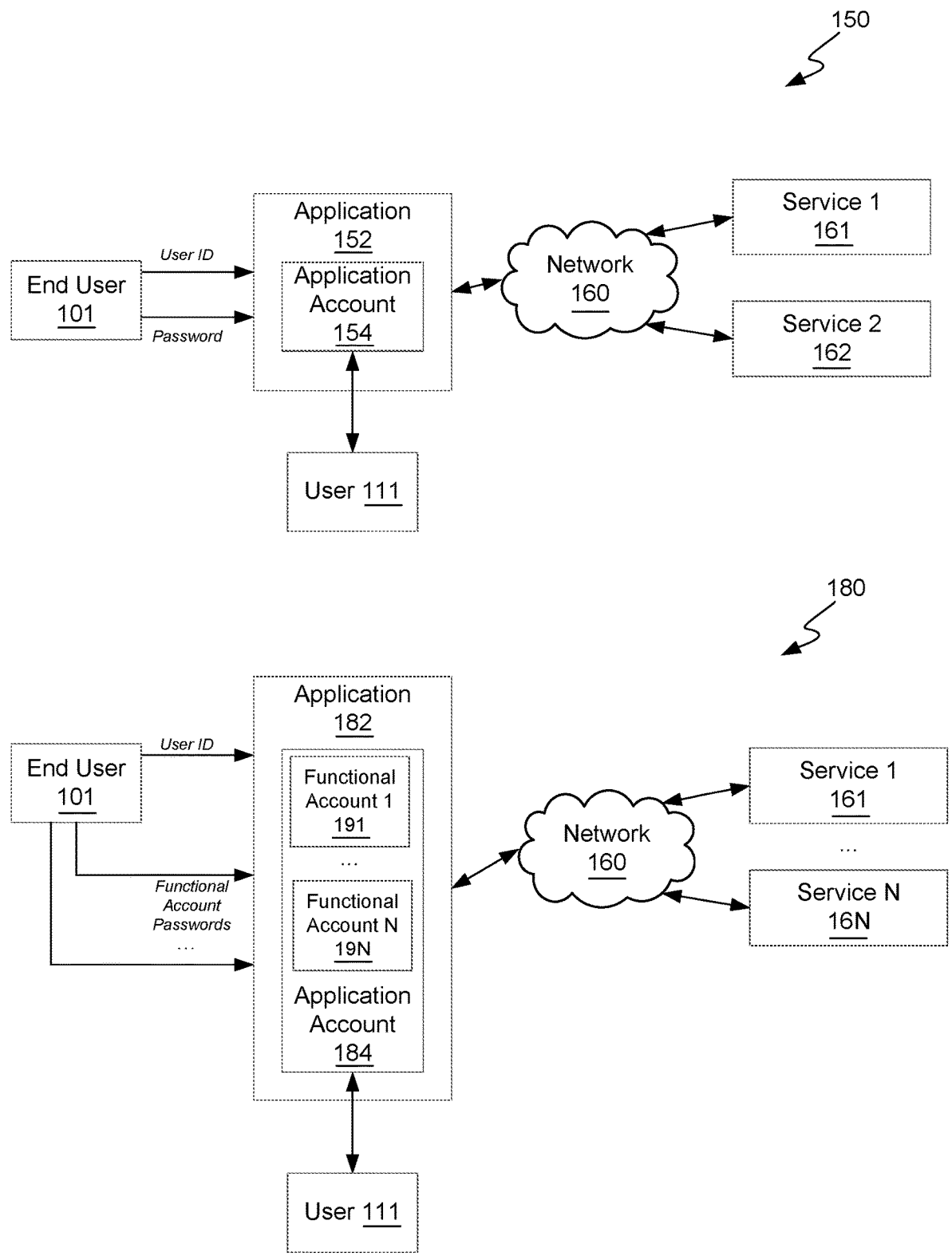
FIG. 1A is a block diagram of conventional password based authentication of users in the context of an application that interacts with one or more service devices of an entity.

At the enterprise level, password authentication is used to control access to various sub-services of the entity application. Access to particular services is typically permitted to an application team member based on their specific role, where this access is managed from a central "application account". For example, a Mastercard online card management application developer may have access to the transaction database service of the application. To preserve the security of the services, the passwords of the application should be updated periodically. Traditionally, an application team member of the entity accepts and manually processes password change requests, and updates the password information accordingly. FIG. 1A illustrates the conventional approach 150 to the provision of electronic services by an entity. A user 111 can typically be an application support/development team member who manages the passwords of all functional accounts, and changes a password(s) when necessary. An application account 154 is used by end user 101 (for example, online banking user who uses an online banking user id/password to login) who accesses services 161, 162 over a network 160 using the application account 154. The application account 154 is invisible to them and is used indirectly (the service call made from application entity to respective service using required functional account is seamless to the end user 101 as it happens at application level when they access the services 161, 162 using application 152. The password change process of application account 154 carried out by the user 111 is seamless to the end user 101 when the end user 101 accesses service 161, 162 using network 160.

As the number of services provided by an entity increases, it is often desirable for the entity to issue multiple sub-accounts for the application, in order to manage access to the respective services by application personnel. As shown in FIG. 1A, a more complex approach to application based service provisioning 180 involves the end user 101 interacting with an application 182 via their user ID and a corresponding password, as described above. However, the application account 184 has associated multiple sub-accounts (referred to as "functional accounts"), and the corresponding password is a password of one of the functional accounts of the entity (referred to as a "functional account password"). Each functional account 191 . . . 19N is associated with a particular service 161 . . . 16N of the entity. The end user 101 can access respective services 161 . . . 16N using functional accounts that are not transparent to them. The user 111 does not need to provide a password(s) to the end user 101 to access the respective services as they use these accounts indirectly as mentioned in an earlier paragraph. The end user 101 just needs to use a regular login id/password(s), such as, for instance, online banking. The user 111 manages passwords of all functional account 184 for the application 182.

The above discussed conventional approaches to password management for applications with multiple functional accounts have several major disadvantages. Specifically, in order to secure an application the password of each functional account must be updated individually. That is, for each individual service 161 . . . 16N provided by the entity, the password information of one or more corresponding functional accounts 191 . . . 19N must be managed separately, leading to increased complexity for systems with a large number of end users and respective services (e.g. where there are many developers, support staff, etc. requiring access to a diverse range of services). For example, a financial institution with an online application that provides personal banking and insurance services may need to control and manage separate login information for distinct functional accounts corresponding to each respective service. Updates performed to the password for each of the distinct functional accounts must also be managed by the entity.

Furthermore, conventional password management systems often rely on a user to manually initiate an update of each functional account password. For example, an administrative user is often required to select a new password via a "change password" option, or similar, implemented within a user interface of the application. The entity has limited ability to ensure that the functional account passwords are updated periodically. Some existing systems are configured to issue notifications to indicating that the password of a particular one of the functional accounts has, or will soon become, expired in order to prompt a manual update. However, the notification may be ignored and the system may continue to use the un-updated password. The likelihood of a password update notification being ignored is increased if multiple notifications are issued within a short period, each prompting an update of different passwords corresponding to the distinct functional accounts associated with the application account. In the case that the user does take action, in response to notifications or otherwise, securing their application account is likely to require multiple "password change" operations, one for each functional account of the application, which is inconvenient and time-consuming.

Automated Password Management

The described embodiments of the present disclosure include a password management system and process that automatically updates the password of each functional account of a particular application. Specifically, the system and process maintains the security of an application provisioned by an entity (referred to herein as an "entity application"), where the application is configured to allow a user (referred to as an "end user") of that application to access services provided by the entity via one or more individual functional accounts. For example, a MasterCard online card management application may have associated various services to allow customers to manage their MasterCard products. These services are accessed by the end users 101 at the enterprise level via functional accounts, such as, for example, a digital wallet account (in the form of an SSO account) to sign into a digital wallet platform, and a transaction view account (in the form of a database account) to permit access to the transaction history of one or more of a customer's card products. The functional accounts associated with an entity application are managed by the password management system via an application account which is accessed by a "user 111" of the system (i.e. a particular application team member).

The password of each functional account is updated periodically by the generation of new password data by the password management system. The new password data is stored within a repository, and replaces the existing password data for the particular functional account. The password management system and processes described herein synchronize local updates of the repository with updates to one or more computing devices of the corresponding entity. Specifically, the new password data is transmitted to a corresponding functional account service device such that the password change is registered at the entity immediately following the update process performed by the described system. In some embodiments, the new password data is automatically transmitted to the user of the application, allowing the user to continue to access the entity's services, via the user's corresponding functional accounts of the entity application, seamlessly in the presence of password updates.

In the described embodiments, the password data of each individual functional account associated with a particular application account of a user is stored as a secured password representation. The secured password representation is a ciphertext, or a hash value, produced by applying an encryption, or hashing, method to the plaintext password of the functional account. A variety of different encryption methods are available for use by the described system to generate the secured password representation, such as symmetric key encryption techniques or asymmetric key encryption techniques.

In some embodiments, the encryption process used to generate the secured password representation is based on information relating to the entity application and/or the individual functional account. For example, an entity may specify that a particularly strong encryption algorithm is to be used in order to generate password representations for a functional account which provides access to highly sensitive data (such as financial transaction data). However, a weaker but less computationally expensive algorithm can be used to encrypt password data of a second functional account which is used to access less sensitive data (e.g. social communication information). In other embodiments, the password management system is unconstrained in the choice of encryption algorithm used to generate the secured password representation for a particular functional account.

In the described embodiments, the system stores data in relation to each functional account for which automated password updates are to be performed. The functional account data includes password data of the functional account, and an indication of the entity application to which the functional account is associated. In some embodiments, the repository stores functional account information across a plurality of different hierarchy levels, such as to differentiate the functional accounts at the business unit level, the environment level, and/or based on the type of the functional account. In the described embodiments, functional account data, and corresponding entity application data, is obtained by the system via a registration process in which the user specifies the details of each functional account associated with the particular entity application account that is to be managed by the password management system. However, the skilled addressee will recognize that, in other embodiments, the functional account data may be provided by another source, such as by the entity or a third party.

In the described embodiments, the automatic password updates performed for the one or more functional accounts occur periodically according to a predetermined update schedule. A specific update schedule can be set individually for each functional account, or for any arbitrary grouping of functional accounts managed by the system. The scheduling of password updates can be either static (i.e. based on predetermined time periods) or dynamic, such that the system performs a password update in response to particular events (as described herein below).

In the described embodiments, the password management system is configured to allow authorized users of the entity application (i.e. an "admin user" or team member) to access the data stored for all the corresponding functional accounts registered to the entity application. In some embodiments, such a user can perform manual updates of the password for any one or more of the functional accounts for a particular entity application via the password management system. An admin user manages the password update functionality configured for an entity application by accessing the password management system using their corresponding application account details.

The password management system described herein is also configured to allow "backdoor" access to the repository in order allow "developer" users to insert information or to execute an upgrade in relation to P1 issues. Specifically, in the case of a functional account which is a database account type, access may be granted to users with a particular role (as designated by administrative team members) to use their functional account to insert/update content in the system database. Performing a backdoor update to the password management system in this manner will result in the transmission of an update notification to the entity to ensure that password data remains synchronized. Urgent issue resolution is also supported the system, which allows the admin user to update the data stored in respect of any functional account managed by the system (i.e. to manually perform a password update).

In providing a solution for the automatic updating of passwords for functional accounts associated with a user's entity application account, the password management system and process described herein advantageously automates the process of updating passwords for a plurality of individual functional accounts associated with an entity application, which increases the convenience of managing each entity application account, allows for the arbitrary scheduling of password updates for separate functional accounts, and promotes efficiency in the scheduling process by removing the need for the entity to schedule, organize and conduct updates, synchronizes password updates at the password management system with corresponding changes at the entity to ensure that end users have seamless access to the entity's services, and interfaces with the entity to ensure that secure password representations produced by the password management system are compatible with the entity.

System

Figure 1B:
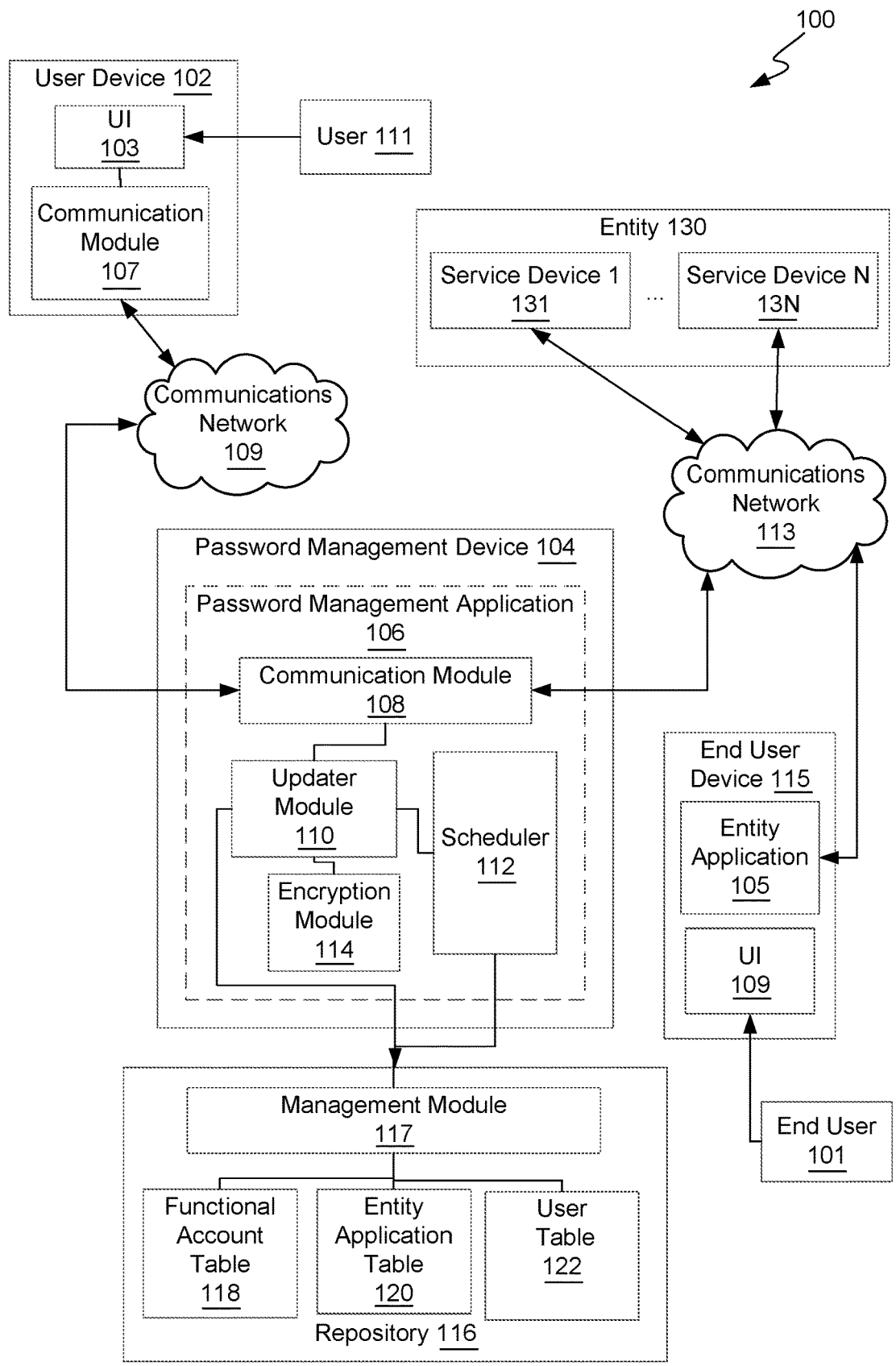
FIG. 1B is a block diagram of a password management system in accordance with some embodiments of the present disclosure.

As shown in FIG. 1B, the password management system 100 includes a user device 102, operated by a password management system user 111 (referred to herein as a "user"), configured interact with a password management device 104 for the purpose of managing one or more passwords associated with an entity application 105 of an entity 130. The entity application 105 is accessed by an end user 101 via a user interface (UI) 109 of an end user device 115. The user 111 interacts with the user device 102 by a UI 103, which is configured to render display elements (such as, for example, text input forms, buttons, and interactive application windows) on the display components of the user device 102. The password management device 104 is configured to execute a password management application 106, which consists of a communications module 108, an updater module 110, a scheduler 112, and an encryption module 114.

The communications module 108 is configured to transmit data to, and to receive data from, corresponding communications module 107 of one or more user devices 102 for the purpose of performing the password management processes described herein below. The communications module 108 transfers data received from the user device 102 to the updater module 110. The updater module 110 is configured to organize and facilitate the updating of password data for one or more functional accounts associated with the entity application 105. The updater module 110 receives and processes functional account data, containing entity application data and user data, that is received at the communications module 108 (as provided by the user device 102) and obtained from a repository 116 of the password management system 100. The updater module 110 is configured to update the password associated with a particular functional account of the entity application 105. The updater module 110 invokes the encryption module 114 to produce a secured password representation of a password as part of the update process (as described herein below), by providing the encryption module 114 with a plaintext representation of the password, and an indication of the encryption technique to be used to produce the secured password representation.

In the described embodiments, the encryption module 114 is a software application executing within the password management device 104. However, in other embodiments the encryption module 114 may be implemented via dedicated hardware components, such as by a trusted platform module (TPM) chip. The encryption module 114 transmits the generated secured password representation back to the updater module 110 which stores the secured representation in the repository 116.

The repository 116 is configured to store data in relation to the entity application 105, each of the one or more functional accounts corresponding to an entity application account that are managed by the system 100, and the user 111, as described below. In the described embodiments, the repository 116 is implemented within a separate computing device to the password management device 104. Specifically, the repository 116 is a device implementing a database system that contains a functional account information table 118, and entity application information table 120, and a user information table 122.

The functional account information table 118 is configured to store functional account data representing the properties of each functional account for which password updates are to be performed by the system 100. In the described embodiments, the stored functional account data includes a functional account identifier, in the form of a string which uniquely designates the particular functional account of the entity application, an application identifier, which uniquely identifies the entity application to which the functional account is associated, an environment type flag, which indicates the environment of the functional account, a functional account type flag, which indicates a functional account type, and a password representation, in the form of a string representing the password for the functional account.

The entity application information table 120 stores data in relation to the entity applications that have one or more functional accounts for which password updates can be performed by the system 100. In the described embodiments, the entity application information table 120 is configured to store data including an application identifier, which uniquely identifies the particular entity application, an application name, in the form of a string describing the name of the application, and a list of functional account identifiers that identify the particular functional accounts that are associated with the entity application. The entity application information table 120 also stores service device data for one or more service devices, each service device corresponding to a functional account associated with a particular entity application. The service device data is stored as a string containing an indication of: the device type, the location of the device on a particular communications network (such as an IP address, or similar address that is interpretable by a computing device to locate the service device), and the authentication protocol used by the service device for authenticating, with the entity and/or service device, a password update that has been conducted in accordance with the processes described herein below.

The user information table 122 is configured to store data in relation to the users 111 of the password management system 100, including a user identifier, representing the unique identity of a user of an application account to which a functional account that is managed is associated, one or more identification details of the user, and one or more password management system login details that are used by the user 111 to log into the password management system 100. Other embodiments of the system may be configured to collect additional information in relation to users, such as identifiers of particular hardware components of the user device 102, in order to prevent fraudulent access to the password management system 100, or for any other reason.

The repository 116 includes a management module 117 which operates to efficiently retrieve and store data from the functional account information 118, entity application information 120, and user information 122 tables. In the described embodiments, the management module 117 is a database management system (DBMS) configured to use the SQL language to query the tables 118, 120, and 122 which are relational database tables. In other embodiments, the password management system 100 may implement a different organization and/or structure for the data repository 116. For example, repository 116 may be configured to store functional account, entity application, and/or user data using a different database table configuration. The repository 116 can also be implemented as a module within the password management device 104, such as in the form of a specific database application.

The scheduler 112 is configured to maintain scheduling data representing the conditions for performing a password update for one or more functional accounts that are managed by the system. The scheduling data is specific to the entity application 105 and the particular functional account for which password updates are being performed. Specifically, the scheduler 112 maintains a record of the time and date of the last password update for each functional account enrolled within the password management system 100. When the password update conditions for a particular functional account are met, the scheduler 112 invokes the updater module 110 to initiate a password update for that functional account. In the described embodiments, the scheduling data can specify that password updates are performed periodically. In this case, the update period can be set to a pre-determined number of days (such as, for example, 60 or 90 days). In other embodiments, the scheduling data can specify one or more dynamic update conditions that, when satisfied, will automatically trigger a password update for the functional account. Dynamic update conditions can be assigned in conjunction with a fixed update period, and the scheduler 112 can be configured to reset the update period on the occurrence of a dynamically triggered update. Alternatively, or in addition, the scheduler 112 can be configured to allow the user 111 to initiate a password update for the functional account at an arbitrary time. The repeated invocation of the updater module 110 by the scheduler 112 ensures that periodic updates are performed to the password of each functional account managed by the password management device 104.

The password management system 100 includes an entity 130 that provisions the entity application 105. The entity 130 provides a set of one or more service devices 131 . . . 13N, where the service devices each provide particular services that are accessible to the user 101 via corresponding functional accounts of the entity application 105. The password management application 106 is configured to communicate with the service devices 131 . . . 13N to provide the entity 130 with updated password data for each respective functional account that is the subject of a password update performed by the system 100. This allows the service devices to be synchronized with the password management device 104, such that interaction between the service devices 131 . . . 13N and the entity application 105 executing on the user device 102 can proceed normally on the occurrence of an automatic password update.

For example, the entity application 105 can be a MasterCard online card management application with an associated MasterCard digital wallet functional account (in the form of an SSO (single sign-on) account), and a MasterCard transaction viewer account (in the form of a database account). The user 101 operates the MasterCard online card management application from the user device 102 involving communication between the user device 102 and the service devices 131 and 13N corresponding to the individual digital wallet and transaction viewer functional accounts. These functional accounts have separate passwords, and the accounts may be registered with the password management system 100 in association with the MasterCard online card management application. The system 100 will periodically and automatically update the digital wallet and transaction viewer functional account passwords, and will synchronize these password updates with the service devices 131 and 13N. A user 101 may then continue to use the MasterCard online card management application with the new (updated) digital wallet and transaction viewer account passwords, as provided by the password management application 106. There is no necessity to provide an additional password(s) to the end user 101 as they can just access the MasterCard online car management application.

Communication between the user device 102 and the password management device 104, and between the password management device 104 and the entity 130 devices, occurs over communications networks 109 and 113 respectively. The communications networks 109 and 113 can be local area networks, or a wide area networks such as the Internet, for the purpose of facilitating the exchange of data between the respective connected devices. In the described embodiments, a secure transport layer communications protocol, such as https, is used for the exchange of data between the devices.

Figure 2:
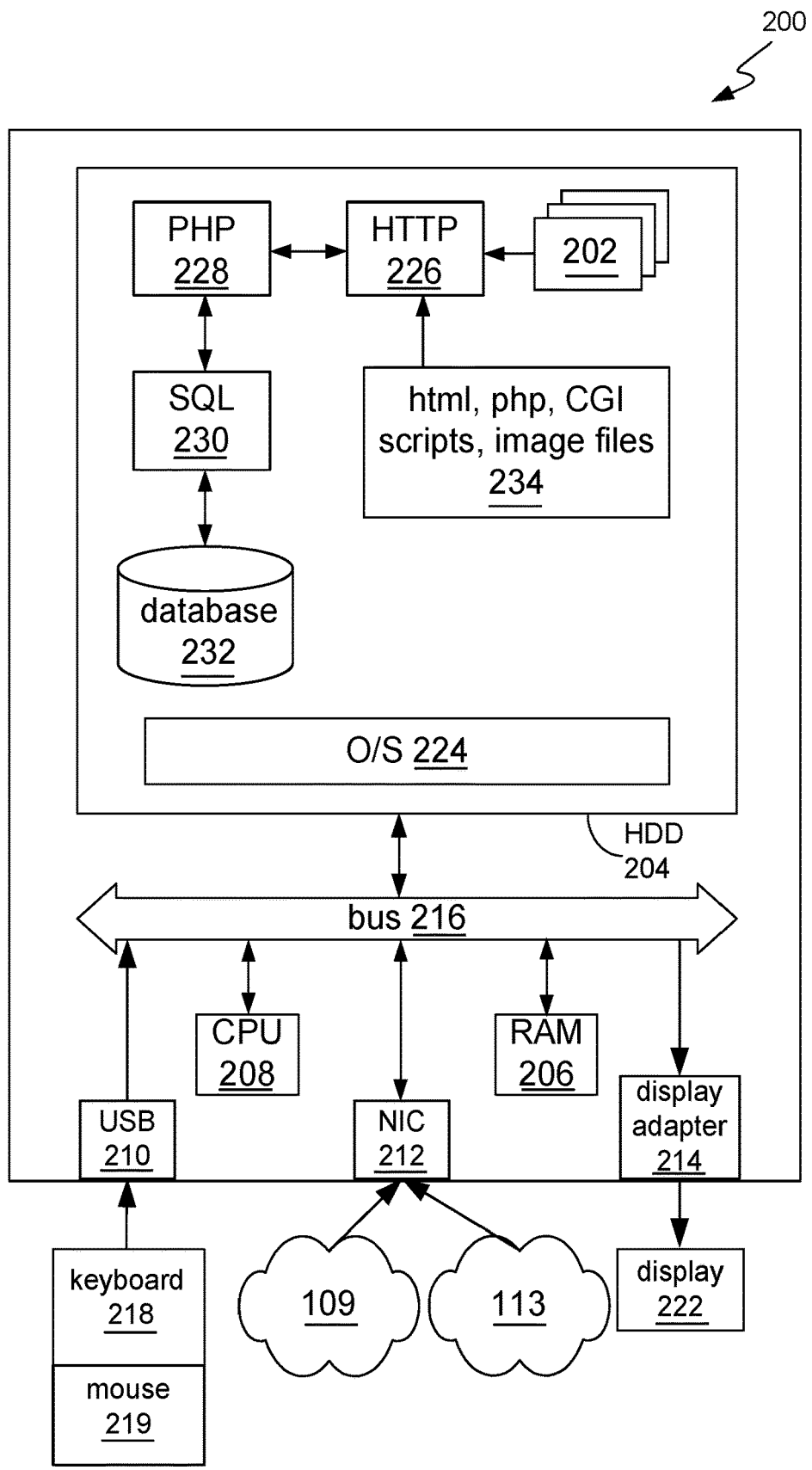
FIG. 2 is a block diagram of a computing device within the password management system.

In the described embodiments of the password management system, the user device 102, the password management device 104, the repository 116, and the service devices 131 . . . 13N are implemented as one or more standard computer systems 200, such as, for example, an Intel IA-32 based computer system, as shown in FIG. 2, and the processes executed by the system 200 are implemented as programming instructions of one or more software modules 202 stored on non-volatile (e.g., hard disk or solid-state drive) storage 204 associated with the computer system, as shown in FIG. 2. However, it will be apparent that at least parts of these processes could alternatively be implemented as one or more dedicated hardware components, such as application-specific integrated circuits (ASICs) and/or field programmable gate arrays (FPGAs), for example.

The system 200 includes standard computer components, including random access memory (RAM) 206, at least one processor 208, and external interfaces 210, 212, 214, all interconnected by a bus 216. The external interfaces include universal serial bus (USB) interfaces 210, at least one of which is connected to a keyboard 218 and a pointing device such as a mouse 219, a network interface connector (NIC) 212 which connects the system 200 to a communications network, such as the Internet, and a display adapter 214, which is connected to a display device such as an LCD or LED panel display 222.

The system 200 also includes a number of standard software modules 226 to 230, including an operating system 224 such as Linux or Microsoft Windows, web server software 226 such as Apache, available at http://www.apache.org, scripting language support 228 such as PHP, available at http://www.php.net, or Microsoft ASP, and structured query language (SQL) support 230 such as MySQL, available from http://www.mysql.com, which allows data to be stored in and retrieved from an SQL database 232.

Together, the web server 226, scripting language module 228, and SQL module 230 provide the system 200 with the general ability to allow users of the Internet 220 with standard computing devices equipped with standard web browser software to access the system 200 and in particular to provide data to and receive data from the database 232.

However, it will be understood by those skilled in the art that the specific functionality provided by the system 200 to such users is provided by scripts accessible by the web server 226, including the one or more software modules 202 implementing the process described herein below, and also any other supporting scripts and data 234, including markup language (e.g., HTML, XML) scripts, PHP (or ASP), and/or CGI scripts, image files, style sheets, and the like.

Process

The password management system and process described here in automatically update the password of one or more functional accounts of an entity application according to an update schedule, and synchronize the updated password data with corresponding devices of the entity, such that security is maintained over the user's application account. The process performed at the password management device 104 to manage the passwords of a user's one or more functional accounts of a particular entity application includes the steps of:

receiving, at a password management device, functional account data representing one or more functional accounts associated with the entity application for use by a user, and the corresponding password data of each functional account;

storing, into a repository, the functional account data; and updating the password data of a particular functional account of the one or more functional accounts associated with the entity application by performing, at the password management device, the steps of:

i) retrieving, from the repository, the stored functional account data of said particular functional account;

ii) processing the retrieved functional account data to generate new password data representing a new password of the particular functional account;

iii) storing, into the repository, the new password data; and iv) transmitting the new password data to a corresponding service device of the entity application to synchronize the service device with the password management device, wherein the updating of the password data is performed based, at least in part, on the functional account data and corresponding scheduling data, said scheduling data representing criteria for updating the password of at least the particular functional account.

Figure 3:
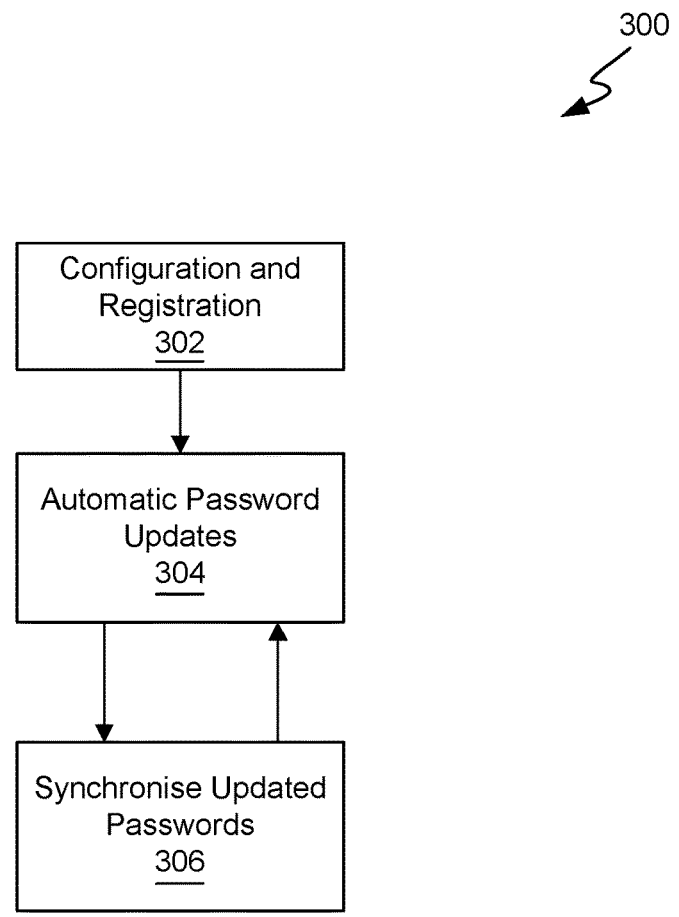
FIG. 3 is a flow diagram of an automatic password management process using the password management system in accordance with some embodiments of the present disclosure.

FIG. 3 illustrates the activities 300 involved in performing automated periodic functional account password updates for an entity application 105, in accordance with the described system 100. At step 302, the password management application 106 is configured to manage passwords of functional account associated with a particular entity application. The entity application table 120 of the repository 116 is configured to contain data in relation to the entity applications that are supported by the password management system 100. Following configuration, the user 111 registers the password of one or more individual functional accounts associated with a particular supported entity application 105 for management by the system 100.

Configuration and Registration

Figure 4:
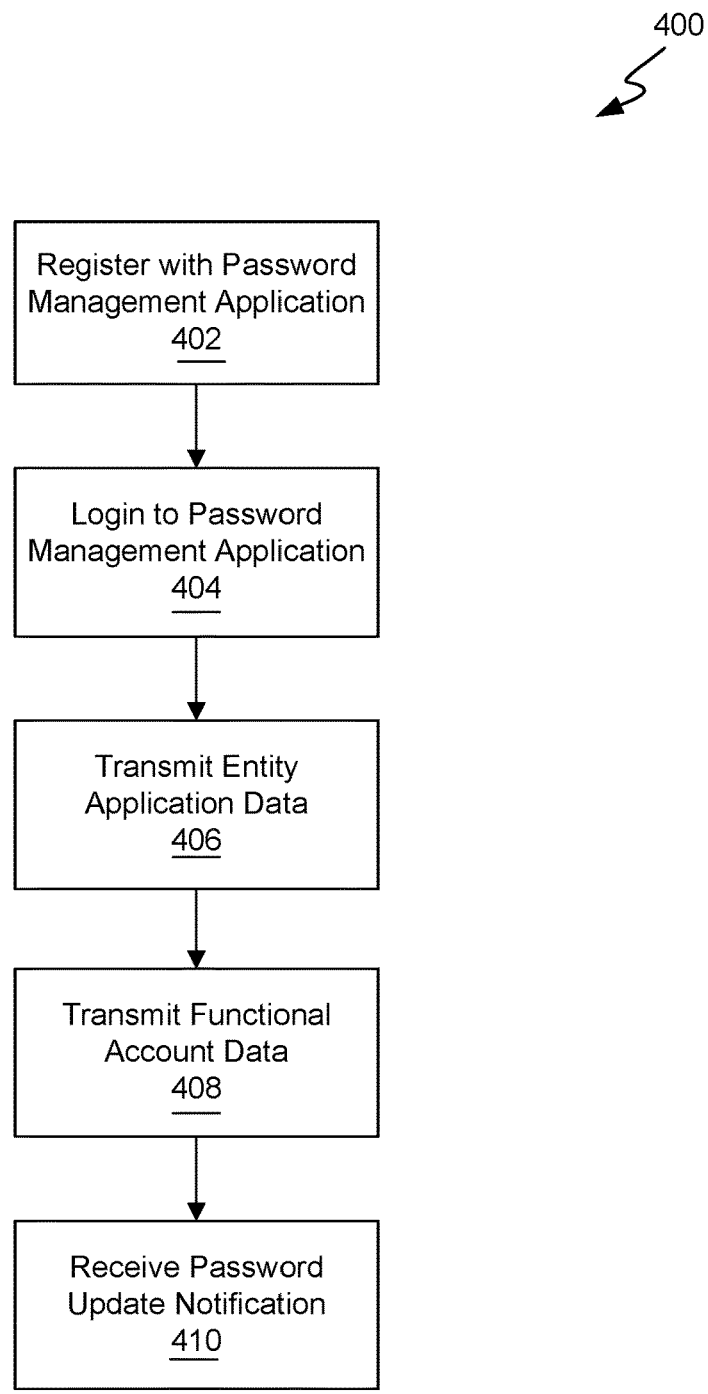
FIG. 4 is a flow diagram of a configuration process of the automatic password management process.

FIG. 4 illustrates a configuration process 400, which commences with the registration of the user 111 with the password management application 106 (at step 402). Registration involves the user 111 providing the password management application 106 with user identification details, including the user's name, address, contact telephone number, and email address. The user identification details are provided to the user device 102 via the UI 103, which then transmits user registration data containing the user identification details to the password management device 104.

The password management application 106 processes the received user registration data and creates a corresponding entry in the user information table 122 to store the user information. Password management system login details are created for the user 111, including a username and a corresponding passcode. The password management system login details are stored in the user information table 122 with a unique user identifier assigned by the password management system 100 to identify the user 111. In various embodiments of the password management system 100, the user identifier is an alpha-numeric character based username that is automatically assigned by the password management system to the user 111. For example, the password management application 106 may assign a username to the user 111 in the form of an integer that uniquely identifies the user 111 within the password management system 100.

Alternatively, the user 111 can supply a candidate username via the user device 102 which, if accepted by the password management application 106, is designated as the username for the user 111. The password management system 100 may place restrictions on the username of a registered user. In some embodiments, username validity criteria are applied at registration to assess the suitability of a candidate username for a particular user. For example, one particular validity criterion may be whether the username is unique among all usernames stored in the user information table 122.

The user 111 accesses the password management application 106 by presenting their username in combination with a password management passcode. The password management passcode is stored within the user information table 122 in a secure form, such as a hash value obtained by applying the SHA-1 algorithm to the passcode. In the described embodiments, the password management passcode is chosen by the user 111 at the time of registration with the password management system 100. In other embodiments, the password management application 106 may designate a particular passcode to the user 111.

At step 404, a registered user 111 logs into the password management application 106 by presenting their username and passcode combination. The user information table 122 is checked to determine whether the user 111 is registered with the system. If the user 111 is registered, then the user information table 122 entry containing the presented username is extracted, and the stored passcode is compared to the hash value produced from the passcode presented on login. If the hash values match, then the user 111 is authenticated and the login attempt is successful. Otherwise, the login attempt fails and further access to the password management application 106 is denied to the user 111.

Following a successful login, the user 111 enrolls the entity application 105 in order to enable the system 100 to perform automated password management of functional accounts associated with that application. At step 406, the user 111 provides the password management application 106 with entity application details that indicate the entity application 105 for which functional account passwords are to be managed. In the described embodiments, the entity application is selected by the user 111 from a series of list elements rendered on the UI 103 of the user device 102. The user 111 can select the entity application from a set of supported entity applications for which the password management system 100 is configured to manage associated functional accounts. Data indicating the supported entity applications is transmitted to the user device 102 from the password management application 106 during the registration process. The user device 102 processes the supported entity application data to generate the set of supported entity applications from which the user 111 may make a selection. Entity application data representing the details of the selected entity application 105 is transmitted from the user device 102 to the password management device 104.

Following the enrollment of the entity application 105, the user 111 enrolls one or more of their functional accounts associated with the entity application 105 for automated password management. At step 408, the user 111 provides functional account information to the password management application 106 via the UI 103 of the user device 102. In the described embodiments, the password management application 106 requests the functional account information in response to receiving the entity application details (such as by transmitting, to the user device 102, data representing a list of supported functional accounts associated with the selected entity application 105 for which password management can be performed). Functional account data encapsulating the information provided by the user 111 is transmitted from the user device 102 to the password management device 104. The functional account information received from the user device 102 includes, for each functional account to be enrolled for password management an indication of the environment type of the functional account, an indication of the type of the functional account, a functional account identifier for the functional account (such as an account name that is unique with respect to the entity application), an entity application identifier of the entity application to which the functional account is associated, and password data for the functional account, including a password representation.

In the described embodiments, the type of the functional account can be designated as a 'Single Sign-on' (SSO) account type, which is used to connect to other applications, a 'database' account type, which is used to connect the entity application to a database, a 'firewall' account type, which is used in the entity application to restrict information sent to particular outside networks, such as the Internet or other Wide Area Networks, in order to assist in securing application data during a transfers to such networks, an 'apache' account type, which is used to connect a web server to an application server, or a 'generic' account type, which represents a generic account used to connect any other interconnecting components with the entity 130. The functional account data is received by the communications module 108 of the password management application 106 and is processed (as described below) to register the functional account in association with the corresponding entity application 105, and the user 111.

The environment of the functional account can be designated as: 'DEV', which represents 'development', 'QA', which represents 'quality assurance environment', 'UAT', which represents 'user acceptance testing', or 'PROD', which represents 'production environment'.

The password management device 104 is configured to perform the automatic updating of password data for registered functional accounts, as described herein below. In some embodiments, the system 100 generates password update notification data representing a notification that the password of a functional account has been updated (at step 410). Password update notification data is transmitted from the password management application 106 to a notification device when a password update is performed for one or more of the registered functional accounts associated with the entity application 105. In some embodiments, the notification device is the user device 102. In other embodiments, the notification device is a computing device that is distinct from the user device 102. In these embodiments, the characteristics of the notification device can be specified by the user 111.

Automatic Password Updates

Figure 5:
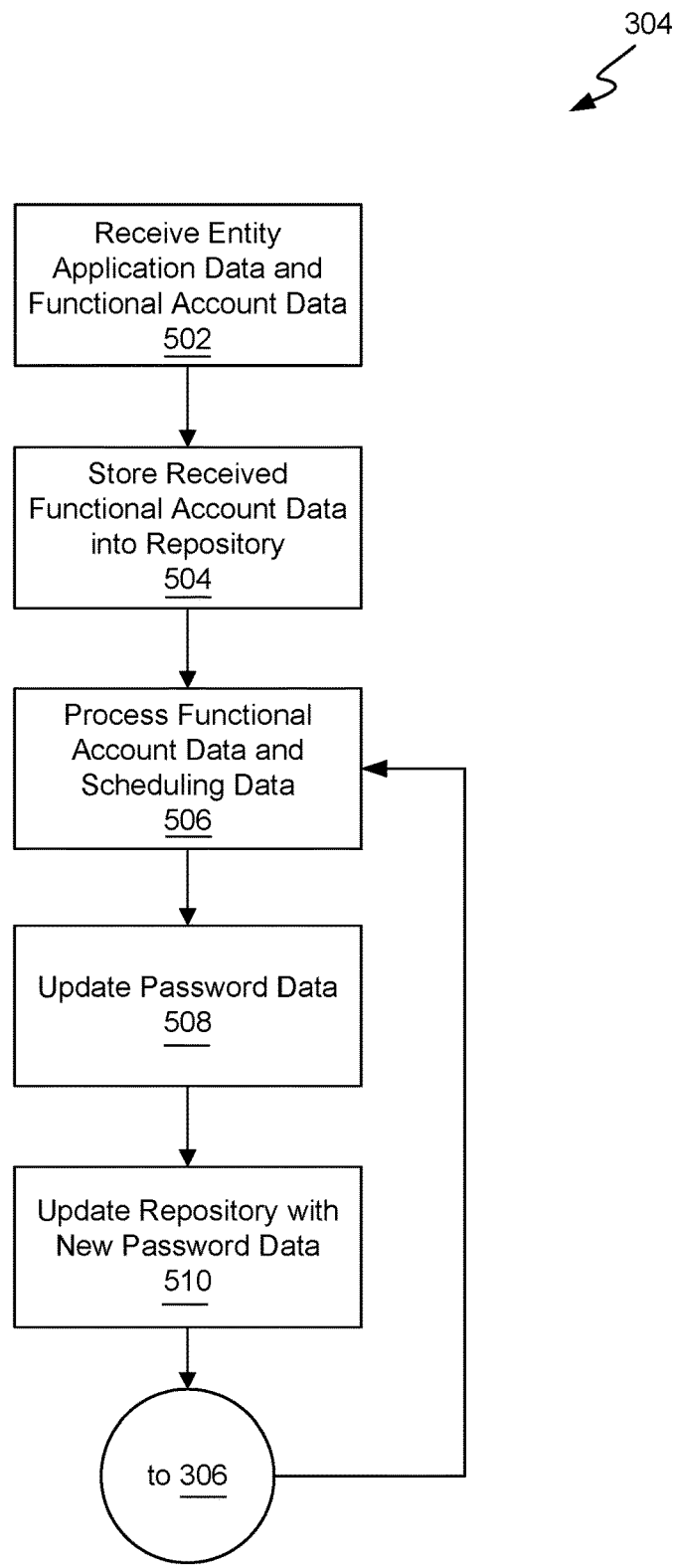
FIG. 5 is a flow diagram of an automatic password update process in accordance with some embodiments of the present disclosure.

FIG. 5 illustrates the process 304 of performing an update to the password information of an enrolled functional account at the password management device 104. At step 502, the password management device 104 receives entity application data and functional account data transmitted from the user interface of the password management application 106, at steps 406 and 408. In the described embodiments, the functional account data includes a functional account identifier, in the form of a string which uniquely identifies the particular functional account of the entity application, an application identifier, which uniquely identifies the entity application to which the functional account is associated, an environment type flag, a functional account type flag, and password data representing the existing password for the functional account.

In some embodiments, the entity application data is received separately to the functional account data. For example, the user 111 may perform an initial enrollment of the entity application 105 with the password management application 106, and subsequently enroll particular functional accounts of that application for password management at a later date. This allows the system 100 to perform password management for functional accounts which are added to an entity application 105 (such as, for example, when the entity 130 upgrades their service offerings) after the user 111 enrolls their respective entity application 105 account (as described above).

At step 504, the received functional account data is stored in the repository 116. In the described embodiments, the received functional account data 105 includes password information plaintext password data representing a plaintext password for each corresponding functional account that is to be managed. In this case, storing the functional account data into the repository 116 includes generating a secure representation for the plaintext password of each of the one or more functional accounts, and storing, for each of the one or more functional accounts, the secure password representation as the password data in the repository 116 of the password management device 104.

For example, the secure password representation produced for the plaintext password of a functional account can be a ciphertext generated by the application of an encryption method to the plaintext password. In the described embodiments, the updater module 110 invokes the management module 117 of the repository 116 to create an entry in the functional account information table 118 for each functional account specified by the received functional account data. The functional account information table 118 entry for a specific functional account is linked to corresponding entries in the entity application information table 120 and the user information table 122 by the application identifier and user identifier fields respectively. The secured password representation is stored in the password representation field of the functional account information table 118 entry.

At step 506, the password management application 106 processes the functional account data and corresponding scheduling data of the password management system 100. The scheduling data is maintained within the scheduler module 112, which is configured to receive, from the repository 116, the functional account data of a particular functional account, determine whether the password of the particular functional account should be updated, and, if so, invoke the updater module 110 to initiate a password update for the particular functional account (i.e. at step 508, as described below). The scheduling data represents criteria for updating the password of one or more functional accounts enrolled with the system 100.

In the described embodiments, the scheduling data represents an update period that indicates the maximum amount of time that can pass between consecutive updates of the password of a particular functional account. In some embodiments, the update period value is fixed and applies to each of the one or more functional accounts enrolled within the system 100. In other embodiments, the update period value is specific to each of the one or more functional accounts, such that different update periods can be set for distinct functional accounts enrolled within the system 100.

For example, for a MasterCard online card management application 105, the password of an associated digital wallet functional account may be scheduled for automatic update every 3 months, while the password of a transaction viewer functional account may be scheduled for less frequent updates (e.g. every 6 months).

The scheduler module 112 is configured to repeatedly read the time-date value of a 'last updated' field of the functional account information table 118 entry for each enrolled functional account and to compare this value to the present time. If the difference between the present time and the value of the 'last updated' field exceeds the update period value for the functional account, as represented within the scheduling data, then a password update is initiated. In other embodiments, the scheduling data may represent conditions in the form of dynamic events which, on occurrence, prompt the automated update of the password for the functional account. For example, the scheduling data can include specific functional account event messages, which may be received from the entity 130, indicating that the functional account of the entity application is being utilized in a particular way that warrants a password update (e.g. when there are multiple login attempts to the functional account, possibly from different hardware identifiers or IP addresses, and/or where all the login attempts occur within a short period of time).

Figure 6:
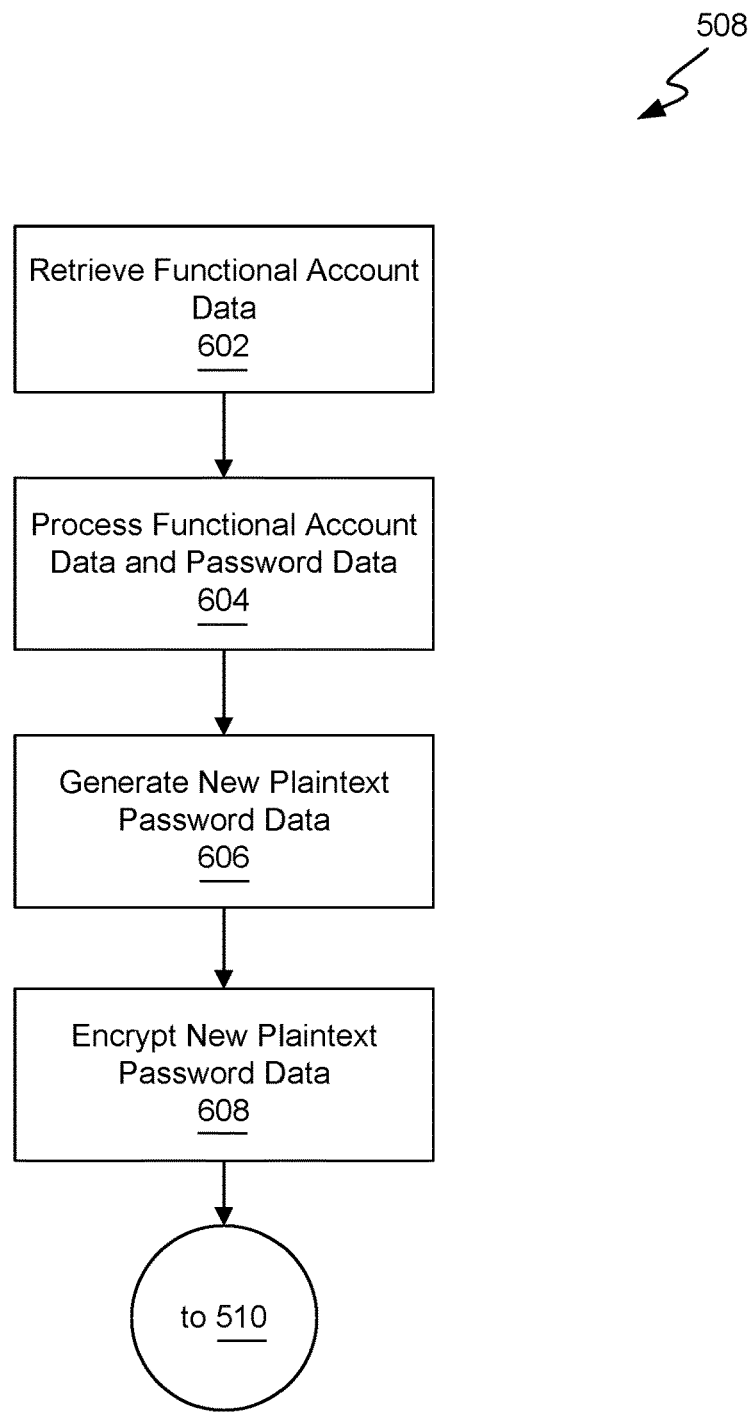
FIG. 6 is a flow diagram of an password update procedure of the automatic password update process.

The password management application 106 performs a scheduled update of the password for a particular functional account of the entity application 105, at step 508. As shown in FIG. 6, the automatic password update process commences (at step 602) with the updater module 110 retrieving, from the functional account information table 118 of the repository 116, stored functional account data corresponding to the functional account that is to be updated. At step 604, the retrieved functional account data, including the corresponding password data, is processed by the updater module 110. In the described embodiments, processing the retrieved functional account data includes extracting the existing password from the corresponding password data of the functional account that is to be updated. The updater module 110 is configured to generate new password data, at step 606. The updater module 110 invokes a password generation utility to create a string representation of a new plaintext password according to one or more password creation conditions. The password creation conditions can be configured such that passwords generated are cryptographically strong. For example, the password creation conditions may specify a minimum character length for the password (e.g. 8 characters), and/or a minimum number of alpha, numeric and/or special characters which must be included in the generated new plaintext password.

In other embodiments, the password management application 106 is configured to generate the new plaintext password based, at least in part, on candidate password data received from the user device 102. For example, the updater module 110 may extract, from repository 116, user contact information, and may generate a new password request message to be sent to the user device 102 via the communications module 108. The user 111 may respond to the password request message with a candidate plaintext password which is received by the password management device 104, in the form of candidate password data, and processed by the updater module 110 to ensure that the candidate plaintext password satisfies the one or more password creation conditions, as described below. The updater module 110 is also configured to process candidate password data received from the user 111 in cases where the user 111 initiates a manual password update. The manual update is performed only if the candidate password data provided by the user 111 satisfies the password creation conditions.

In the described embodiments, the new password data represents a new password that sufficiently differs from the existing password of the functional account according to one or more password comparison criteria. Specifically, generating new password data includes: i) generating new plaintext password data representing a new plaintext password for the corresponding functional account, ii) comparing the new plaintext password to the existing plaintext password represented by the password data of the functional account, and iii) repeating steps (i) and (ii) if the new plaintext password does not meet one or more password comparison criteria. In the described embodiments, the one or more password comparison criteria specify a set of minimal character specific differences that exist between a new password and an existing password. For example, a password comparison criterion may be whether the new password differs from the existing password in at least 3 character positions.

The processing of candidate password data, as received from the user 111, by the updater module 110 can include comparing the candidate plaintext password to the existing password of the functional account in order to ensure that the aforementioned password comparison criteria are satisfied in respect of the candidate password. If the candidate password does not meet one or more of the password comparison criteria then the candidate password can be rejected, and a corresponding password rejection message transmitted to the user device 102 to inform the user 111 that their chosen candidate password is inadequate.

At step 608, the updater module 110 invokes the encryption module 114 to encrypt the generated new plaintext password. The encryption process converts the new plaintext password representation into a secure new password representation, such as a hash value or ciphertext. For example, the updater module 110 can provide the encryption module 114 with arguments consisting of a string representation of the new plaintext password, and a string specifying that the SHA-1 hashing algorithm is to be used to produce the secure password representation. In response, the encryption module 114 applies SHA-1 hashing to the new plaintext password string and returns a string containing the secure password representation to the updater module 110.

Following the generation of the new password for the functional account, the password management application 106 updates the repository 116 with the new password (at step 510). The updater module 110 instructs the management module 117 of the repository 116 to store, into the repository 116, the new password by overwriting the contents of the password representation field of the corresponding entry in the functional account information table 118. The updater module 110 is configured to buffer the existing password data of the functional account (such as the existing secure password representation) prior to performing the overwrite operation, such that the existing password data can be used within the synchronization process described herein below. Following the buffering operation, the new secure password representation replaces the existing secure password representation in the functional account information table 118 entry.

Synchronization of the Updated Password with the Entity

Figure 7:
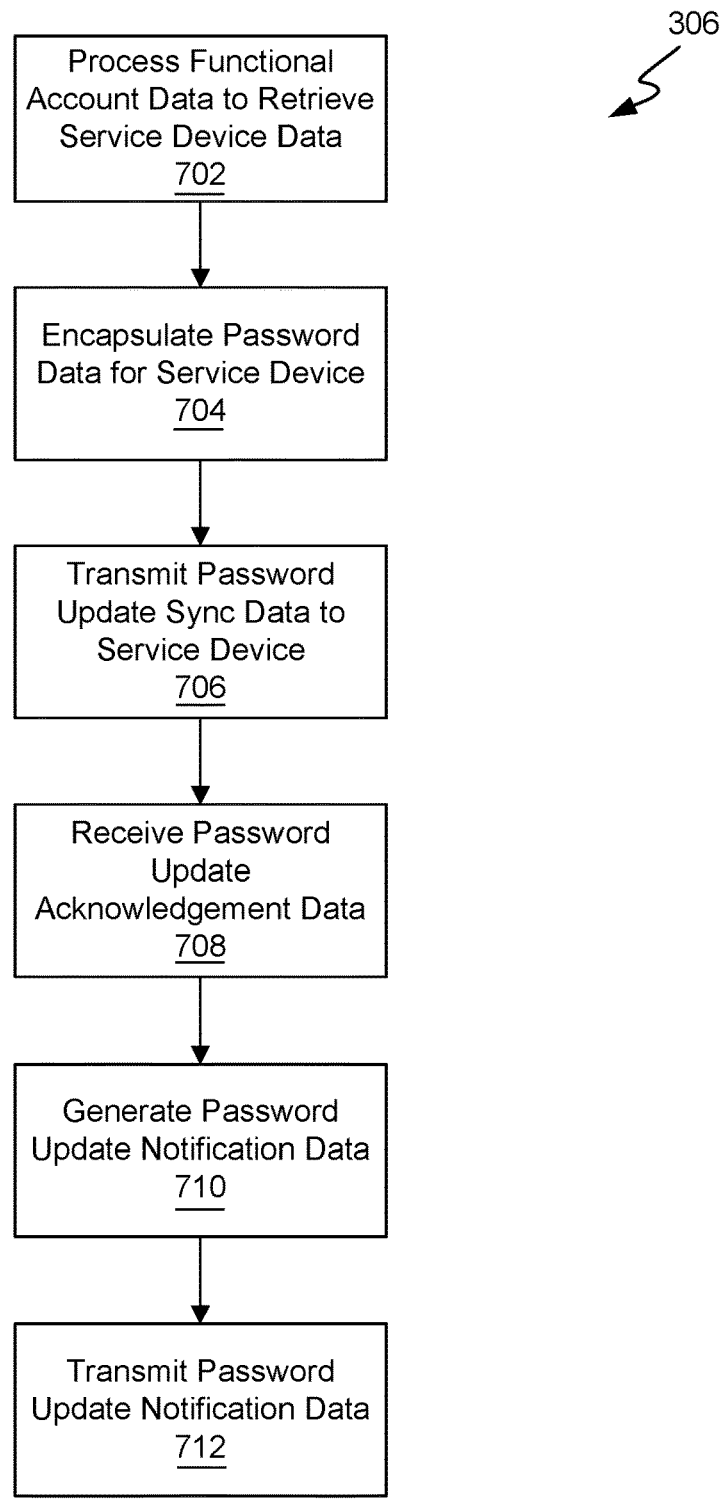
FIG. 7 is a flow diagram of a password synchronization process in accordance with some embodiments of the present disclosure.

The password management application 106 is configured to synchronize the new password with the entity 130 which provides the entity application 105 to which the passwords are associated (at step 306). Specifically, the new password data generated by the password management device 104 is transmitted to a service device 131 . . . 13N which corresponds to the particular functional account for which the password update is performed. FIG. 7 illustrates the password synchronization process, which includes (at step 702) processing, at the password management device 104, the functional account data to retrieve, from the repository 116, service device data of an entity 130 of the entity application 105. The updater module 110 invokes the management module 117 to retrieve, from the entity application information table 120, data representing the identity of the service device corresponding to the particular functional account for which the password update is performed. The service device identity can be specified by an IP address or a uniform resource locator (URL) which enables the transmission of electronic messages from the password management device 104 to the service device, via the communications network 113.

At step 704, the password management application 106 encapsulates the new password data in a form for transmission to the identified service device. In the described embodiments, the password management device 104 generates password update sync data, including: i) entity application identity data representing the identity of the entity application 105, ii) functional account identity data representing the functional account of the entity application 105, and iii) updated password data representing the new password for the functional account, as produced by the update process. The password update sync data is transmitted to the identified service device, at step 706. The identified service device receives the password update sync data, and processes this data to determine the identities of the entity application 105 and the corresponding functional account for which the password update has been performed.

The updated password data contains new password data representing the new password generated by the password management application 106. In some embodiments, the updated password data can also include existing password data, which represents the secured password of the particular functional account prior to the password update. The new password data and the existing password data may represent the respective passwords in a secured form such that interception of the password update sync data by a third party will not reveal the corresponding plaintext passwords. The identified service device can be configured to process the existing secured password representation, in combination with the entity application identity data and functional account identity data, to verify that the automated password update was performed by, or on behalf of, the user 111. In some embodiments, the functional account identifier and password data are stored in a cryptographic vault of the entity 130 in the form of labels. The service device updates the corresponding label with the new password received from the password update sync data. The labels are used as a source from where passwords are referred during the processing of a request.

The service devices 131 . . . 13N can be configured to transmit password update acknowledgement data to the password management device 104 indicating the successful receipt of the new password data for the functional account. The password update acknowledgement data is received by the communications module 108 of the password management device 104 (at step 708), and is processed by the updater module 110 to generate password update notification data (at step 710) representing a notification that the password of the functional account has been updated at the entity 130. The updater module 114 invokes the communications module 108 to transmit the password update notification data to a notification device in the form of the user device 102, or another computing device as specified by the user 111.

EXAMPLE

Consider a MasterCard online banking application 105 which has associated two functional accounts: a digital wallet account, and a transaction viewer account.

User Joe Smith manages the MasterCard online banking application 105 within the password management system 100 by logging into the MasterCard online banking account (the "application account") using an account username and a corresponding account authentication code. The password management device 104 is operated to enroll the digital wallet and transaction viewer functional accounts, as associated with the MasterCard online banking application 105, such that the passwords for these functional accounts can be automatically managed by the password management system 100, in accordance with the processes described above.

Let the existing passwords for the digital wallet and transaction viewer functional accounts be:
 "WALLET123"; and
 "myviewer456"
respectively, with secured password representations produced according to the SHA-1 algorithm as:
 "9e3a5d21b000fe324b0174bcec82dbc1e59727ac"; and
 "2718c0bb779285e6b842adc59ff6b10226367072".

The password management application 106 generates respective new plaintext passwords of:
 "NEWWALLET123"; and
 "newMyviewer456",
with secured new password representations of:
 "f6592970b410a459df36af23f5466d997cb1d61b"; and
 "6a84802d1c038efbab85a1a5aa645d6436cd0c72",
and synchronizes these new passwords with service devices 131 and 13N, which are respectively configured to manage digital wallet and transaction viewer services for MasterCard.

The password management device 104 transmits password update sync data to each service device in the form of two password sync messages. Each password sync message contains a functional account identifier ("FA ID") with a value specific to the digital wallet ("DWALLET") or transaction viewer ("TVIEWER") account to which the message relates, and an entity application identifier that specifies the MasterCard online banking application 105. The functional account identifier distinguishes the functional accounts in the case that a single service device handles updates for multiple functional accounts associated with the same entity application 105 (i.e. in the case where the service device 131 processes password updates for both the digital wallet and transaction viewer accounts).

Each password sync message also contains the updated password data representing the existing (i.e. pre-update) password and the newly generated password for the respective functional account. Table 1 shows the password sync messages generated by the password management application 106 for transmission to the service devices 131 and 13N corresponding to the digital wallet and transaction viewer functional accounts respectively.

TABLE 1

Example password update sync data fields for service devices of digital wallet and transaction viewer functional accounts.

| | Password Sync Message for Service Device 131 | Password Sync Message for Service Device 132 |
|---|---|---|
| Entity App ID | MC_OnlineBankApp_001 | MC_OnlineBankApp_001 |
| FA ID | DWALLET | TVIEWER |
| Existing Password Representation | 9e3a5d21b000fe324b0174bcec82dbc1e59727ac | 2718c0bb779285e6b842adc59ff6b10226367072 |
| New Password Representation | f6592970b410a459df36af23f5466d997cb1d61b | 6a84802d1c038efbab85a1a5aa645d6436cd0c72 |

The service devices 131 and 13N receive the respective password update sync message, and process the password update sync data field values to: i) authenticate the password update request by comparing the existing password representation of the password sync message to the password representation currently maintained by the service device, and ii) if the comparison in step i) results in a match between the password representations, update the password representation maintained by the service device (i.e. as a cryptographic vault label that is used as a source from where passwords are referred on the device) with the new password representation of the password sync message.

On a successful password update, each service device 131, 13N then acknowledges the update by transmitting password update acknowledgement data to the password management device 104. The password management device 104 transmits a password update notification message to a notification device, which is the user device 102 in this case, such that Joe Smith is altered to the update of the passwords for the digital wallet and transaction viewer functional accounts by the password management application 106. Joe Smith can access the new passwords for the digital wallet and transaction viewer accounts by logging into the password management device 104 using the MasterCard online banking application account credentials, and can subsequently distribute the new passwords to the appropriate personnel.

Authorized Access and PROD Use

As described herein above, a user 111 is provided with access to password management system 100 services in relation to the management of enrolled entity applications 105, and corresponding functional accounts. The password management system 100 can be configured to provide additional users with access to the functional account password data that is managed by the password management application 106. In some embodiments, the password management application 106 can be accessed by a 'DEV' user 111 of a particular entity application 105. The DEV user 111 is configured by the system 100 to exist without registration (as described below), and to have a pre-defined level of access which is determined based on the application specific configuration of the DEV environment. For example, the DEV user can be granted access to DEV all functional accounts. Similar user registrations can be configured for the QA, UAT and PROD environments.

The user information table 122 can be configured to contain login and password data for a DEV user associated with a particular entity application 105 supported by the password management system 100. The DEV user represents development team members associated with the particular entity application 105, and allows these members to access the password management functionality of the system 100 without undergoing the individual user registration process. In some embodiments, the DEV user will have access to particular DEV functional accounts associated with one or more application development roles, such as support accounts, and/or production accounts for the entity application 105. In other embodiments, the system 100 can be configured to provide particular password management services for an entity application 105 to specific sub-users defined in relation to distinct development roles, such as DEV-Support and DEV-Production users.

In production support development roles there is often a need to resolve P1 issues by inserting or updating entity application information. In the described embodiments, the system 100 can be accessed by an 'admin' user. The password management application 106 provides the admin user with the ability to modify data stored within the repository 116 in order to resolve P1 issues, or otherwise. In other embodiments, an entity application 105 can have dedicated accounts for issue resolution or to implement changes to the functional accounts associated with one or more other applications. The issue resolution accounts are role based. For example, a PROD functional account can be accessed by users that are designated a PROD role for the entity application, and this account can be used to resolve P1 issues via backdoor access (as described above). These issue resolution accounts can be configured as temporary accounts that are valid for limited period of time, such as for example a few hours from the time at which the account is created in the system 100. The admin user may create one or more issue resolution accounts, the login details of which can be distributed to select personnel of an entity 130 (such as application developers associated with a particular development role).

For example, the MasterCard production support team may have access to a production support resolution account for a MasterCard online card management application. This enables production support developers to access password management data maintained by the system 100 for the MasterCard online card management application (e.g. to reset the password of a functional account). When the password data stored in respect of a particular functional account managed by the system 100 is modified by the admin user or the user of an issue resolution account, the password management application 106 can be configured to provide a notification of the password update to one or more registered users of the system 100. The notification may proceed via the transmission of password update notification data from the password management device 104 to a notification device, such as the user device 102 or another prescribed device, in accordance with the process described for step 712 above.

Many modifications will be apparent to those skilled in the art without departing from the scope of the present disclosure.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge.

What is claimed is:

1. A process for managing passwords of an entity application, the process comprising:
    receiving, at a password management device, functional account data representing a plurality of different functional accounts associated with the same entity application for use by a user, and corresponding password data of each functional account;
    storing, into a repository, the functional account data; and
    updating the password data of first and second functional accounts of the plurality of functional accounts associated with the entity, application by performing, at the password management device, the steps of:
        i) retrieving, from the repository, the stored functional account data of the first and second functional accounts;
        ii) processing the retrieved functional account data to generate new password data representing new passwords of the first and second functional accounts;
        iii) storing, into the repository, the new password data; and
        iv) transmitting the new password data for the first functional account to a first service device of the entity application and transmitting the new password data for the second functional account to a second service device of the entity application to synchronize the first and second service devices with the password management device, wherein the updating of the password data is performed based, at least in part, on the functional account data and corresponding scheduling data, the scheduling data representing criteria for updating the password of, at least, the first and second functional accounts.

2. The password management process according to claim 1, wherein the updating is performed repeatedly according to a predetermined update period, the update period determined by the processing of the scheduling data.

3. The password management process according to claim 2, wherein the update period is specific to each functional account.

4. The password management process according to claim 1, wherein the scheduling data is received from at least one of the first and second service devices.

5. The password management process according to claim 1, wherein the password data of each functional account is plaintext password data representing a plaintext password for the corresponding functional account.

6. The password management process according to claim 5, wherein storing the functional account data into the repository of the password management device comprises:
    generating a secure password representation for the plaintext password of each functional account; and
    storing, for each functional account, the secure password representation as the password data in the repository.

7. The password management process according to claim 6, wherein generating a secure password representation for the plaintext password includes applying an encryption method to the plaintext password data.

8. The password management process according to claim 5, wherein processing the retrieved functional account data includes extracting password data stored for the corresponding functional account.

9. The password management process according to claim 5, wherein generating new password data includes:
    i) generating new plaintext password data representing a new plaintext password for the corresponding functional account;
    ii) comparing the new plaintext password to the plaintext password represented by the password data of the functional account; and
    iii) repeating steps i) and ii) if the new plaintext password does not meet at least one password comparison criteria.

10. The password management process according to claim 9, wherein the at least one password comparison criteria specify a set of minimal character specific differences that exist between a new password and an existing password.

11. The password management process according to claim 9, wherein generating new password data includes generating a secure representation for the new plaintext password.

12. The password management process according to claim 11, wherein generating a secure password representation for the new plaintext password includes applying an encryption method to the new plaintext password.

13. The password management process according to claim 6, wherein storing, into the repository, the new password data includes storing a secure password representation for a new plaintext password as the password data for the corresponding functional account.

14. The password management process according to claim 1, wherein transmitting the new password data to the first and second service devices includes:
    processing, at the password management device, the functional account data to retrieve, from the repository, service device data of an entity of the entity application;
    generating, at the password management device, password update sync data including 1) entity application identification data representing the identity of the entity application, ii) functional account identification data representing the identity of the first and second functional accounts associated with the entity application, and iii) updated password data representing at least one password for the first and second functional accounts.

15. The password management process according to claim 14, wherein the updated password data includes the new password data and the existing password data for the first and second functional accounts, the existing password data representing the passwords of the first and second functional accounts prior to the password update, wherein the first and second service devices use the existing password data to authenticate the password update.

16. The password management process according to claim 1, including transmitting, from the password management device, password update notification data to a notification device of the user, the password update notification data representing a notification that the passwords of the first and second functional accounts has been updated.

17. A password management system comprising:
   a password management device, including:
      a processor; and
      a computer readable memory; and
   a repository;
   the password management device configured to execute a password management process, the process including the steps of:
      receiving, functional account data representing a plurality of different functional accounts associated with a same entity application for use by a user, and corresponding password data of each functional account;
      storing, into the repository, the functional account data; and
      updating the password data of first and second functional accounts of the plurality of functional accounts associated with the entity application by performing the steps of:
         i) retrieving, from the repository, the stored functional account data of the first and second functional accounts;
         ii) processing the retrieved functional account data to generate new password data representing new passwords of the first and second functional accounts;
         iii) storing, into the repository, the new password data; and
         iv) transmitting the new password data for the first functional account to a first service device of the entity application and transmitting the new password data for the second functional account to a second service device of the entity application to synchronize the first and second service devices with the password management device, wherein the updating of the password data is performed based, at least in part, on the functional account data and corresponding scheduling data, the scheduling data representing criteria for updating the password of, at least, the first and second functional accounts.

\* \* \* \* \*